Dec. 3, 1935.   J. C. KITTELL   2,023,024
ENGINE MUFFLER
Filed Aug. 29, 1931
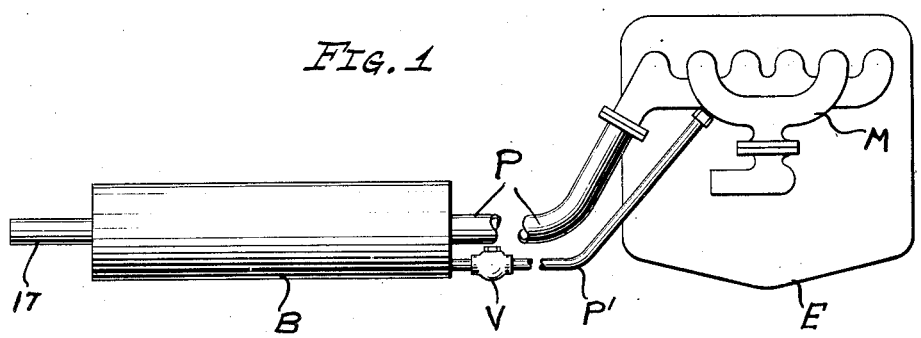
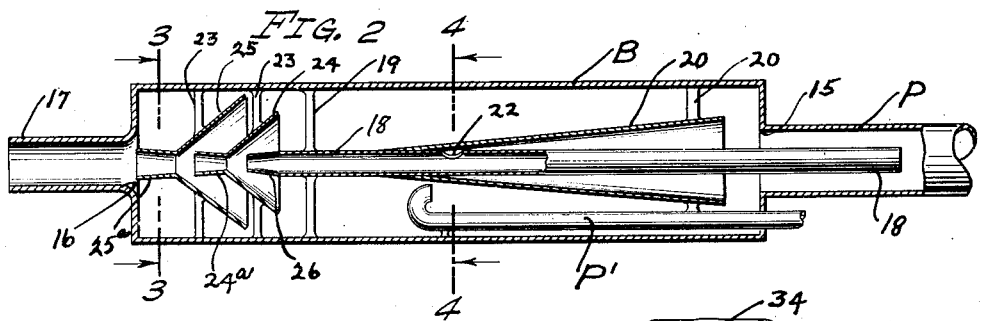
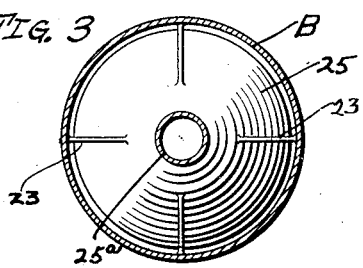
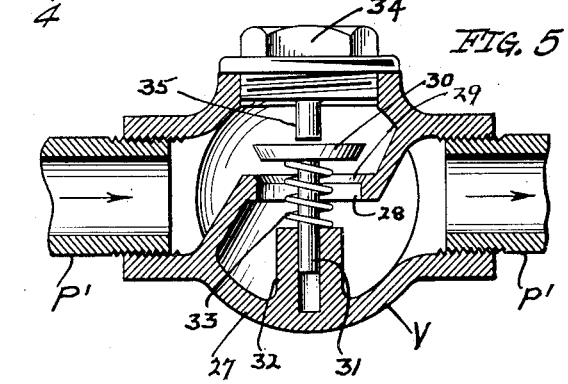
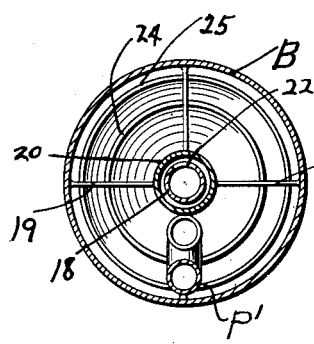
INVENTOR.
JULIUS C. KITTELL
BY Edwin D. Jones
ATTORNEY Patented Dec. 3, 1935

2,023,024

UNITED STATES PATENT OFFICE 2,023,024

ENGINE MUFFLER

Julius C. Kittell, San Pedro, Calif., assignor to Kittell Vacuum Muffler Co., Inc., a corporation of California Application August 29, 1931, Serial No. 560,084

1 Claim. (Cl. 137—160)

My invention relates to mufflers for internal combustion engines, and it has for a purpose the provision of a muffler which is characterized by its ability to muffle and control the liberation to atmosphere of the exhaust gases from an engine in such a manner as to reduce back pressure to a minimum, thereby increasing to a maximum the effective power delivered by the engine.

It is also a purpose of my invention to provide a muffler having the aforementioned back pressure reducing property and yet adaptable to high speed engines as well as to low speed and heavy duty engines.

A further purpose of my invention is the provision of the combination of a muffler and a device for connecting the muffler to the intake manifold of an engine so that at least a part of the exhaust gases are conducted to the engine cylinders to cause the unburnt gases to combine with the fresh fuel and to thus reduce consumption of the fresh fuel by the engine. Further, the reciprocal advantage is obtained of utilizing the suction of the engine to relieve the exhaust gas pressure in the muffler to further reduce back pressure, and also to increase the fluid pressure in the intake manifold for the purpose of lowering the resistance offered to the pistons on their suction strokes by the relatively low pressure of the atmosphere air and thereby further increasing the engine power developed.

I will describe only one form of muffler, and one form of connecting device each embodying my invention, and will then point out the novel features thereof in the claim.

In the accompanying drawing,

Fig. 1 is a view showing in side elevation one form of muffler and one form of device for utilizing exhaust gases for fuel, each embodying my invention, and both of which are shown in applied position to an internal combustion engine.

Fig. 2 is a vertical longitudinal sectional view of the mulffler.

Figs. 3 and 4 are sectional views taken on the lines 3—3 and 4—4, respectively, of Fig. 2, and looking in the directions of the arrows.

Fig. 5 is an enlarged sectional view of the valve element of the connecting device shown in Fig. 1.

Referring specifically to the drawing, I have illustrated a muffler, comprising a hollow and elongated body B having an inlet 15 at one end connected to an exhaust pipe P so as to receive exhaust gases from an internal combustion engine E, and an outlet 16 at the other end which communicates with the usual outlet pipe 17. A pipe 18 of relatively small diameter is supported by arms 19 within the body B so as to be disposed along the major axis of the body with one end extending into the exhaust pipe P, and the opposite end spaced from the adjacent end wall of the body.

Surrounding a part of the pipe 18 is a second pipe 20 which is of conical form with its larger end facing the exhaust pipe P and spaced from the adjacent end wall of the body, and supported concentrically of the pipe 18 by radiating arms 21. The smaller end of the conical pipe merges into the pipe 18 where it is spot-welded or otherwise secured. A port 22 is formed in the pipe 18 adjacent the small end of the pipe 20 for the purpose of permitting exhaust gases in the conical pipe to pass into the straight pipe.

Between the confronting ends of the pipes 17 and 18 are one or more funnel shaped members supported in fixed position, one in advance of the other, by radiating arms 23. In the present instance, I have shown two such members 24 and 25 of different diameters at their larger ends, and provided with outlet nozzles 24a and 25a at their smaller ends which increase in internal diameter from their points of connection with the funnels to their free ends. These tapered nozzles are alined with the pipes 17 and 18, the outlet end of the pipe 18 having a constricted nozzle 26 extending into the member 24.

As so far described, the muffler functions in its association with an engine, as follows;

Part of the gases traversing the exhaust pipe P enter the large end of the pipe 20. The remainder of the gases enter the muffler body in that space surrounding the pipes 18 and 20. Those gases entering the pipe being of relatively high pressure traverse the pipe and are discharged from the nozzle 26 at high velocity. From the nozzle they pass successively through the members 24 and 25, being finally discharged into the pipe 17 to atmosphere.

Constriction of the nozzle 26 accelerates the velocity of the gases as emitted, and as discharged into the member 24, the gases produce a suction in the large end of the member which draws part of the gases from the body into the member to combine with those from the nozzle 26. The gases now enter the nozzle 24a and in passing therethrough are permitted to expand slightly, entering the member 25 at a somewhat reduced velocity. At this point the gases function to produce a suction in the member 25 which draws gases from the body and over a larger area than in the case of the member 24, and which gases are forced into the nozzle 25a to be discharged into the outlet pipe 17. The gases in traversing the nozzle 25a expand slightly, and with their discharge therefrom, they produce a suction in the body adjacent the outlet which operates to withdraw the other gases from the body to combine with the other gases for final discharge from the muffler.

In the use of my muffler with high speed engines, the pipe 18 and the funnel members 24 and 25 are all that is required to effect complete ejection of all gases from the body B without setting up appreciable back pressure in the exhaust pipe P and yet effectively muffling the explosions.

However, in the instance of a low speed heavy duty engine, the pipe 20 is employed in conjunction with the other elements to function as I will now describe.

Because of the high velocity of those gases traversing the pipe 18 there is produced in the port 22 an intensive suction which functions to draw the gases entering the pipe 20 into the pipe 18. By virtue of the size and location of the port, and the length and form of the pipe 20, gases will accumulate in the pipe 20 to produce an elastic medium against which the succeeding gases impinge. Their impingement against this fluid medium is cushioned by reason of its elasticity, and, in consequence, very little if any back pressure is generated in respect to the gases in the exhaust pipe P.

With low speed engines the exhaust pulsations are slow and of large volume in point of gas, and, hence, gas would not traverse the pipe 18 in quantity sufficient to produce a suction of the requisite intensity to cause all gases to be drawn from the muffler. However, by the provision of the pipe 20 and the port 22, the gases entering the pipe 20 are pushed and drawn into the pipe 18 to such an extent as to set up a continuous gas flow through the pipe 18 thereby producing an uninterrupted suction at the nozzle 26 which acts constantly to eject the gases from the muffler and thus prevent back pressure building up in the exhaust pipe.

As previously expressed herein, my invention also includes a device by which a part of the exhaust gases can be delivered to the engine cylinders for the purpose of utilizing the unburnt parts of the gases as fuel, and to thereby lessen the total amount of fresh fuel consumed by the engine.

This device comprises a pipe P' communicating at one end with the intake manifold M of the engine, as shown in Fig. 1. At the other end the pipe extends into the muffler body B, as shown in Fig. 2, with its inner extremity bent back upon itself so that its open end is facing the inlet end of the muffler.

In the line of the pipe P' is a valve element V (Fig. 5) which includes a body 27 having a port 28 formed with a seat 29 for a valve 30. The valve has a stem 31 movable in a guide 32, and a spring 33 urges the valve off of its seat to open the port 28. A screw plug 34 permits access to the valve, and it is provided with a stop pin 35 which defines the open position of the valve.

In the operation of the device, the intensive suction produced in the body B combines with the suction produced in the intake manifold which causes the exhaust gases to be drawn into the manifold where they mix with the fresh fuel from the carburetor for final delivery to the engine. In this manner fresh fuel consumption by the engine is greatly reduced.

In order to obtain under all conditions, the proper fuel mixture for good combustion, the valve element V is provided. It will be understood that the intensity of the suction created in the intake manifold varies inversely with the speed of the engine, that is to say, as the engine speed increases, the suction decreases. The valve 30 is mounted so as to be responsive to this suction and in such a manner that with the engine operating at an idling speed the valve is held nearly or fully closed by the suction but as the engine increases from this minimum the suction decreases and the spring 33 operates to open the valve, the valve being completely open when the speed is at a maximum.

Thus the valve operates automatically to control the amount of exhaust gases admitted to the intake manifold in accordance with the speed of the engine. By this mode of operation stalling of the engine when idling or at a relatively low speed, is prevented by admitting only a small quantity of exhaust gases, or in some cases no exhaust gases.

My device, aside from utilizing the exhaust gases as fuel, provides another advantage. Bearing in mind that the pressure of the exhaust gases is communicated to the intake manifold, it is of necessity communicated to the combustion chambers of the cylinders. As a consequence, the fluid pressure on the pistons is greatly increased during their intake strokes, and hence, the resistance offered to movement of the pistons during their suction stroke is greatly decreased. In this manner the power output of the engine is further increased.

Although I have herein shown and described only one form of muffler and one form of device for utilizing exhaust gases as fuel, each embodying my invention, it is to be understood that various changes and modifications may be made herein without departing from the spirit of my invention and the spirit and scope of the appended claim.

I claim:

A muffler comprising; a body having a gas inlet and an alined gas outlet; a pipe in the body having its inlet end extending through the gas inlet of the body and of a diameter less than that of the inlet to receive a portion of the gas before it enters the body so that its original high velocity is maintained while traversing the pipe, the remainder of the gas passing into the body around the pipe and expanding to a lower velocity and pressure than the gas traversing the pipe, and the outlet end of the pipe being spaced from but alined with the gas outlet of the body so that the high velocity gas as discharged from the pipe produces in the body a negative pressure or suction to withdraw the low velocity gas from the body and discharge it into atmosphere; a conical member disposed in the body to surround said pipe with its large end facing the inlet to receive at least a part of the gas entering the body around the pipe; a port in said pipe adjacent the small end of the conical member; and funnel members interposed between the outlet end of the pipe and the gas outlet of the body, said members having their smaller ends alined with the pipe, facing the gas outlet and increasing in diameter toward the gas outlet.

JULIUS C. KITTELL.